(12) United States Patent
Pawloski

(10) Patent No.: US 6,994,535 B2
(45) Date of Patent: Feb. 7, 2006

(54) METHOD AND APPARATUS FOR FORMING A GUIDE RIB ON A SECTION OF PLASTIC FILM

(75) Inventor: James C. Pawloski, Bay City, MI (US)

(73) Assignee: S.C. Johnson Home Storage, Inc., Racine, WI (US)

( * ) Notice: Subject to any disclaimer, the term of this patent is extended or adjusted under 35 U.S.C. 154(b) by 322 days.

(21) Appl. No.: 10/184,431

(22) Filed: Jun. 27, 2002

(65) Prior Publication Data

US 2004/0000743 A1    Jan. 1, 2004

(51) Int. Cl.
*B29C 47/02*    (2006.01)

(52) U.S. Cl. .................. 425/113; 156/66; 156/500; 156/555; 425/115

(58) Field of Classification Search .................. 156/66, 156/500, 555; 425/113, 115
See application file for complete search history.

(56) References Cited

U.S. PATENT DOCUMENTS

| | | |
|---|---|---|
| 1,746,565 A | 2/1930 | Sundback |
| 1,959,318 A | 5/1934 | Sundback |
| 2,354,485 A | 7/1944 | Slaughter |
| 2,916,197 A | 12/1959 | Detrie et al. |
| 3,038,225 A | 6/1962 | Ausnit |
| 3,198,228 A | 8/1965 | Naito |
| 3,338,284 A | 8/1967 | Ausnit |
| 3,338,285 A | 8/1967 | Jaster |
| 3,340,116 A | 9/1967 | Naito ........................... 156/92 |
| 3,347,298 A | 10/1967 | Ausnit et al. |
| 3,372,442 A | 3/1968 | Ishimatsu |
| 3,410,327 A | 11/1968 | Ausnit |
| 3,416,199 A | 12/1968 | Imamura |
| 3,462,332 A | 8/1969 | Goto |
| 3,565,737 A | 2/1971 | Lefevre et al. |
| RE27,174 E | 9/1971 | Ausnit |
| 3,715,420 A | 2/1973 | Kiyono et al. .............. 264/171 |
| 3,841,816 A | 10/1974 | Herz |
| RE28,969 E | 9/1976 | Naito |
| 4,139,664 A | 2/1979 | Wenrick ....................... 428/31 |
| 4,259,133 A * | 3/1981 | Yagi ........................... 156/500 |
| 4,263,079 A | 4/1981 | Sutrina et al. ......... 156/244.11 |
| 4,268,938 A | 5/1981 | Walchli |
| 4,279,677 A | 7/1981 | Takahashi ................... 156/160 |
| 4,306,924 A | 12/1981 | Kamp ........................... 156/66 |
| 4,354,541 A | 10/1982 | Tilman |
| 4,363,345 A | 12/1982 | Scheibner |
| 4,419,159 A | 12/1983 | Herrington ................... 156/66 |
| 4,476,180 A * | 10/1984 | Wnuk ........................ 428/220 |
| 4,484,352 A | 11/1984 | Katzin ......................... 383/65 |
| 4,555,282 A | 11/1985 | Yano ............................. 156/66 |
| 4,561,109 A | 12/1985 | Herrington ................... 383/65 |
| 4,618,383 A | 10/1986 | Herrington ................... 156/66 |
| 4,672,723 A | 6/1987 | Hugues et al. ................ 24/587 |
| 4,676,851 A | 6/1987 | Scheibner et al. ............ 156/66 |

(Continued)

FOREIGN PATENT DOCUMENTS

CA    764647    8/1967

(Continued)

*Primary Examiner*—Robert B. Davis

(57) ABSTRACT

A method and apparatus for forming a rib on a section of plastic film utilizes a roll having a groove, extrudes molten polymer into the groove, and places the section of plastic film in contact with the molten polymer in the groove. The molten polymer in the groove is allowed to cool below the melting point thereof while the section of plastic film is in contact with the polymer to cause bonding therebetween and thereby form the rib.

17 Claims, 16 Drawing Sheets

U.S. PATENT DOCUMENTS

| | | | | |
|---|---|---|---|---|
| 4,698,118 | A | 10/1987 | Takahashi | 156/499 |
| 4,701,358 | A | 10/1987 | Behr et al. | 428/35 |
| 4,710,968 | A | 12/1987 | Borchardt et al. | 383/63 |
| 4,736,496 | A | 4/1988 | Fisher et al. | 24/587 |
| 4,741,789 | A | 5/1988 | Zieke et al. | 156/66 |
| 4,755,248 | A | 7/1988 | Geiger et al. | 156/244.25 |
| 4,765,036 | A | 8/1988 | Iguchi et al. | 24/289 |
| 4,778,282 | A | 10/1988 | Borchardt et al. | 383/63 |
| 4,796,300 | A | 1/1989 | Branson | 383/63 |
| 4,812,056 | A | 3/1989 | Zieke | 383/63 |
| 4,822,539 | A | 4/1989 | Tilman et al. | 264/40.4 |
| 4,832,768 | A * | 5/1989 | Takahashi | 156/500 |
| 4,854,917 | A | 8/1989 | Mizukoshi | 464/111 |
| 4,859,259 | A | 8/1989 | Scheibner | 156/66 |
| 4,898,492 | A | 2/1990 | Janowski | 403/340 |
| 4,906,310 | A | 3/1990 | Broderick et al. | 156/66 |
| 4,929,487 | A | 5/1990 | Tilman et al. | 428/163 |
| 5,002,781 | A * | 3/1991 | Van Erden | 426/121 |
| 5,009,828 | A | 4/1991 | McCree | 264/177.1 |
| 5,012,561 | A | 5/1991 | Porchia et al. | 24/576 |
| 5,049,223 | A | 9/1991 | Dais et al. | 156/244.11 |
| 5,056,933 | A * | 10/1991 | Kamp | 383/63 |
| 5,067,822 | A | 11/1991 | Wirth et al. | 383/61 |
| 5,092,684 | A | 3/1992 | Weeks | 383/61 |
| 5,140,727 | A | 8/1992 | Dais et al. | 24/587 |
| 5,209,574 | A | 5/1993 | Tilman | 383/63 |
| 5,211,481 | A | 5/1993 | Tilman | 383/63 |
| 5,248,201 | A | 9/1993 | Kettner et al. | 383/63 |
| 5,368,394 | A | 11/1994 | Scott et al. | 383/63 |
| 5,369,847 | A | 12/1994 | Naya et al. | 24/30.5 |
| 5,384,942 | A | 1/1995 | Siegel | 24/587 |
| 5,403,094 | A | 4/1995 | Tomic | 383/63 |
| 5,509,734 | A | 4/1996 | Ausnit | 383/63 |
| 5,573,614 | A * | 11/1996 | Tilman et al. | 156/66 |
| 5,577,305 | A | 11/1996 | Johnson | 24/587 |
| 5,953,796 | A | 9/1999 | McMahon et al. | 24/400 |
| 6,080,252 | A | 6/2000 | Plourde | 156/66 |
| 6,112,374 | A | 9/2000 | Van Erden | 24/400 |
| 6,299,720 | B1 | 10/2001 | Van Erden | 156/244.19 |
| 6,686,005 | B2 | 2/2004 | White et al. | 428/35.2 |
| 2003/0066267 | A1 | 4/2003 | Nelson | |

FOREIGN PATENT DOCUMENTS

| | | |
|---|---|---|
| DE | 2 036 432 | 2/1971 |
| DE | 30 32 889 | 12/1981 |
| EP | 0 025 656 | 3/1981 |
| EP | 0 089 680 | 9/1983 |
| EP | 0 114 373 | 8/1984 |
| EP | 0 155 612 A2 | 9/1985 |
| EP | 0 155 612 B1 | 9/1985 |
| EP | 0 220 476 | 5/1987 |
| EP | 0 241 334 | 10/1987 |
| EP | 0 398 731 | 11/1990 |
| EP | 0 427 010 | 5/1991 |
| EP | 0 543 737 | 5/1993 |
| FR | 1493748 | 7/1967 |
| FR | 2 620 377 | 3/1989 |
| GB | 1092452 | 11/1967 |
| GB | 1156170 | 6/1969 |
| GB | 1326945 | 8/1973 |
| GB | 2 008 538 | 6/1979 |
| WO | WO 02/34634 | 5/2002 |

* cited by examiner

METHOD AND APPARATUS FOR FORMING A GUIDE RIB ON A SECTION OF PLASTIC FILM

TECHNICAL FIELD

The present invention relates to thermoplastic storage bags, and more particularly to a method and apparatus for producing guide ribs for reclosable thermoplastic storage bags.

BACKGROUND ART

Thermoplastic storage bags having reclosable fasteners have been in wide use to store various items. One type of bag includes interengagable male and female closure elements or profiles that may be closed by pinching the elements together at one end thereof between a user's finger and thumb and sliding the user's opposed finger and thumb along the elements toward another end of the bag. One difficulty faced by a user of such a bag results from misalignment of the male and female closure elements of the bag as the user is attempting to seal the bag. Often, such misalignment prevents full closure of the bag and typically results in wasted effort and frustration by the user.

Attempts have been made over the years to provide a structure that facilitates closing of a bag by a user. An example of such a structure comprises a guide rib disposed on each side of the closure elements and extending parallel thereto. The guide rib(s) guide the user's finger and thumb as the user is attempting to close the bag so that the incidence of closure element misalignment is minimized.

Kamp U.S. Pat. No. 4,306,924 discloses an apparatus for producing a plastic container having occludable closure strips. The closure strips are supplied from a supply source and fed to a control roll, wherein the control roll in turn feeds the closure strips to an optional heating means that preheats a base portion of the closure strips. The closure strips are then transferred to a rotating casting cylinder having a pair of spaced apart circumferential grooves. The closure profiles are disposed in the grooves of the casting cylinder as the casting cylinder rotates and plastic film is extruded onto the casting cylinder to produce a plastic film with integral closure profiles.

Zieke et al. U.S. Pat. No. 4,741,789 discloses a method and apparatus for applying a profile and adjacent ribs to a traveling film web. The method comprises the steps of drawing a web of bag film over idler rolls into a forming and joining station. The forming and joining station includes a hopper for receiving plastic material, a body with heating means for heating and melting the plastic material and a screw auger for advancing the molten plastic material to a die block. The method further comprises the steps of applying a base member to the film by means of a polytetrafluorethylene-coated lay-on roller and extruding a male profile member, a first rib member and a second rib member as separate extrudates on a bag film web.

Geiger et al. U.S. Pat. No. 4,755,248 discloses a method and apparatus for producing a reclosable bag film. The method comprises the steps of drawing a film web from a die block around a driven rotatable casting roll and passing the film web over idler rolls to a closure member extrusion and joining station. A female profile is extruded from a first extruder and a male profile is extruded from a second extruder onto the film web as the film web passes around an idler roll at the station. The method further comprises the step of passing the film web and profiles around a chilled casting roll to cool the film web and profile.

SUMMARY OF THE INVENTION

According to one aspect of the present invention, a method of forming a rib on a section of plastic film includes the steps of providing a roll having a groove, extruding molten polymer into the groove, and placing the section of plastic film in contact with the molten polymer in the groove. The molten polymer in the groove is allowed to cool below the melting point thereof while the section of plastic film is in contact with the polymer to cause bonding therebetween and thereby form the rib.

In accordance with a further aspect of the present invention, a method of forming a pair of ribs on either side of a closure element carried by a section of plastic film includes the steps of providing a roll having a pair of grooves, extruding molten polymer into the grooves, and placing the section of plastic film in contact with the molten polymer in the grooves such that the closure element is disposed between the grooves. The molten polymer in the grooves is allowed to cool below the melting point thereof while the section of plastic film is in contact with the polymer to cause bonding therebetween and thereby form the ribs.

In accordance with yet another aspect of the present invention, an apparatus for forming a rib on a section of plastic film includes a roll having a groove and an extrusion die for extruding molten polymer into the groove. A positioning system places the section of plastic film in contact with the molten polymer in the groove such that the molten polymer in the groove is allowed to cool below the melting point thereof while the section of plastic film is in contact with the polymer to cause bonding therebetween and thereby form the rib.

Other aspects and advantages of the present invention will become apparent upon consideration of the following detailed description.

DESCRIPTION OF THE PREFERRED EMBODIMENTS

Figure 1:
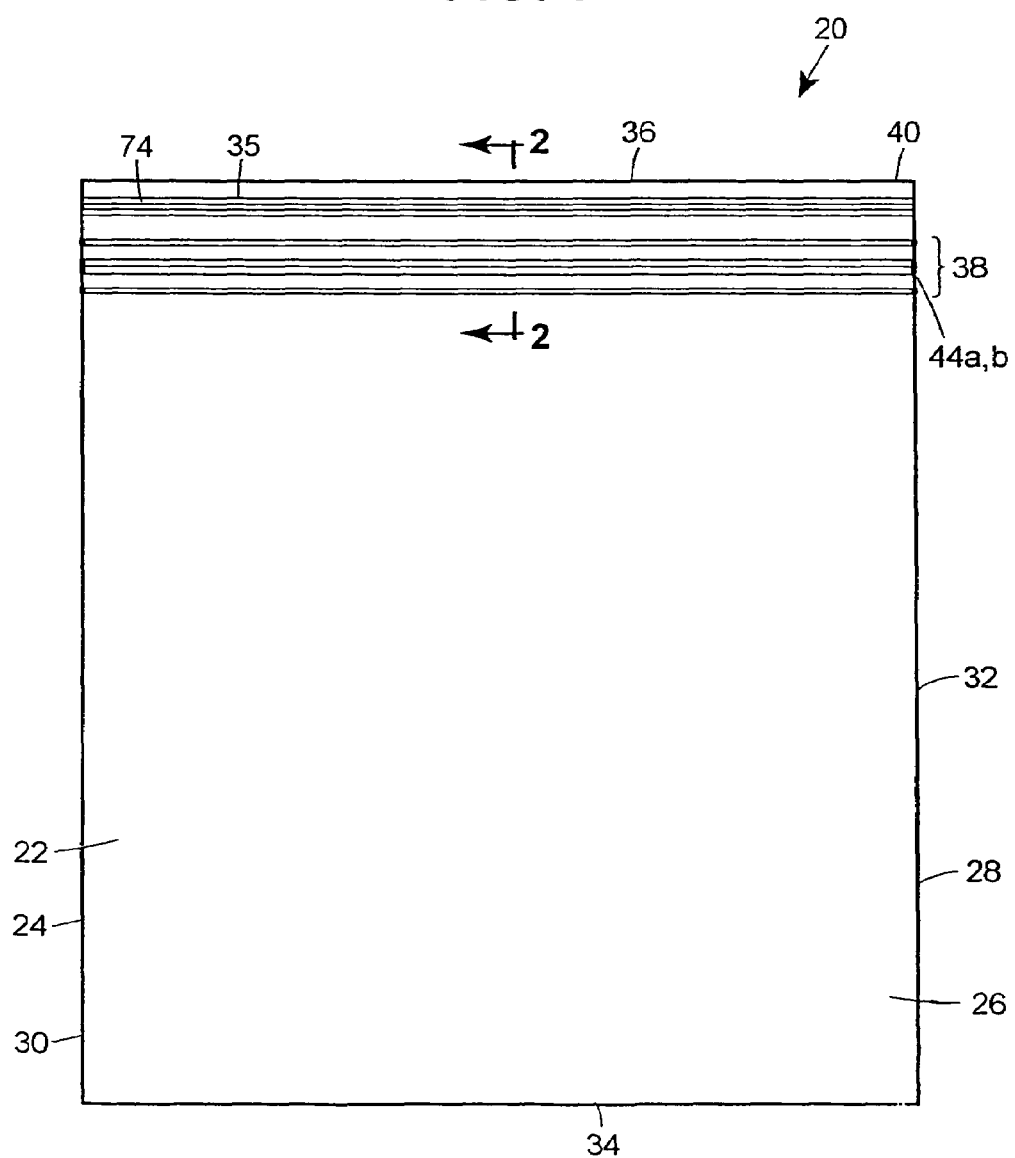
FIG. 1 is an elevational view of a reclosable thermoplastic storage bag according to the present invention.

Referring to FIG. 1, a reclosable pouch in the form of a thermoplastic storage bag 20 comprises first and second body portions 22, 24 joined to one another to form first and second bag walls 26, 28. The first and second bag walls 26, 28 are joined at first and second side portions 30, 32, respectively, and at a bottom portion 34. An opening 35 is disposed at a top portion 36 of the bag 20. A closure mechanism 38 and two lips 40 are also disposed at the top portion 36 of the bag 20.

Figure 2:
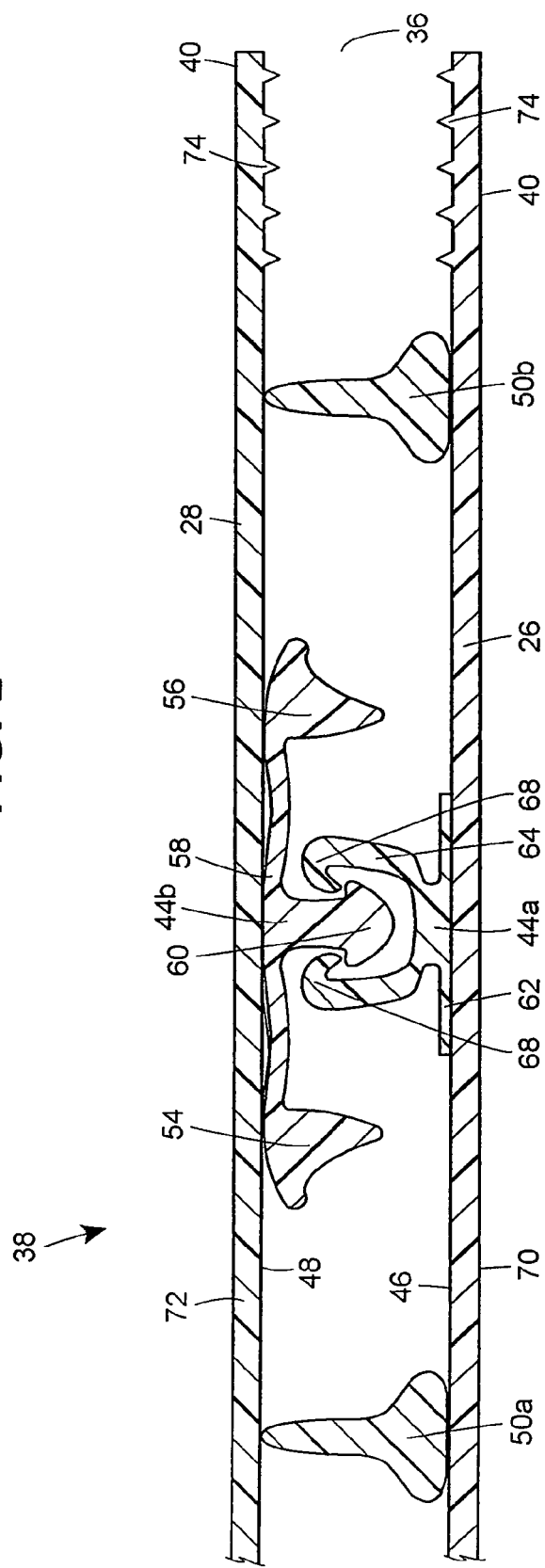
FIG. 2 is an enlarged, fragmentary, sectional view taken generally along the lines 2—2 of FIG. 1.

Referring to FIG. 2, female and male closure elements 44a, 44b of the closure mechanism 38 are disposed on opposing inside surfaces 46, 48 of the first and second body portions 22, 24, respectively. According to a first embodiment, guide ribs 50a, 50b are disposed on the inside surface 46 of the first body portion 22 on either side of (i.e., flanking) the female closure element 44a. The guide ribs 50a, 50b extend in a direction generally parallel to the closure elements 44a, 44b and are spaced sufficiently therefrom to guide a user's finger(s) and facilitate alignment of the closure elements 44a and 44b into interlocking engagement when sealing the closure mechanism 38.

The male closure element 44b comprises a base 58 integral with flanking side members 54 and 56 and an arrow-shaped engagement member 60 that extends from the base 58. The female element 44a comprises a base 62 with a C-shaped profile member 64 extending therefrom, wherein the female element 44a is adapted to receive the male element 44b when pressure is exerted on the closure elements by a user's finger(s) during closing of the bag. The side members 54 and 56 are of a sufficient size and proximity to the engagement member 60 such that the side members 54 and 56 move together with the member 60 when the members 60 and 64 are engaged and disengaged. The side members 54 and 56 also have a height which is less than the height of the engagement member 60, and the members 54 and 56 extend beyond tips 68 of the female profile member 64 when the engagement member 60 is engaged with the female profile member 64. Thus, at such time, the tips 68 of the female profile member 64 reside between the side members 54 and 56 and the male engagement member 60.

Figure 3:
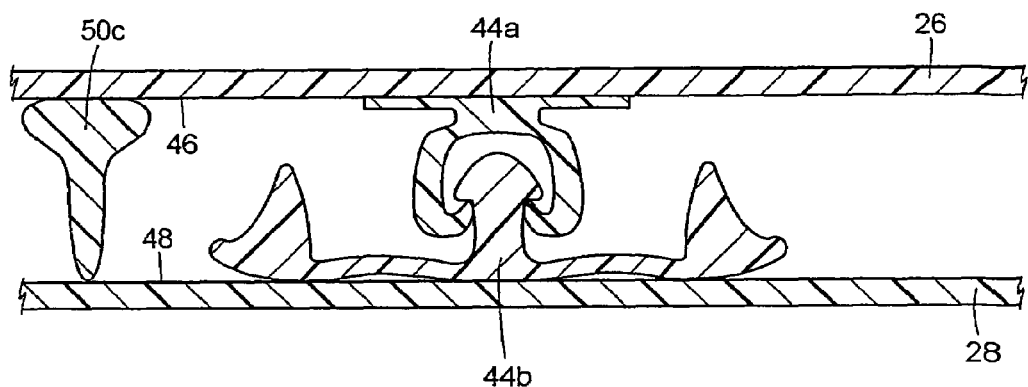
FIGS. 3–8 are sectional views similar to FIG. 2 illustrating alternative bags produced in accordance with the present invention.
Figure 4:
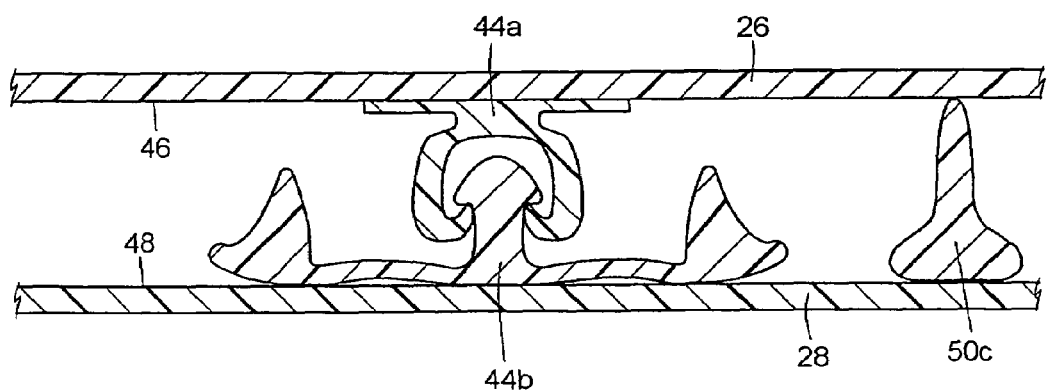
Figure 5:
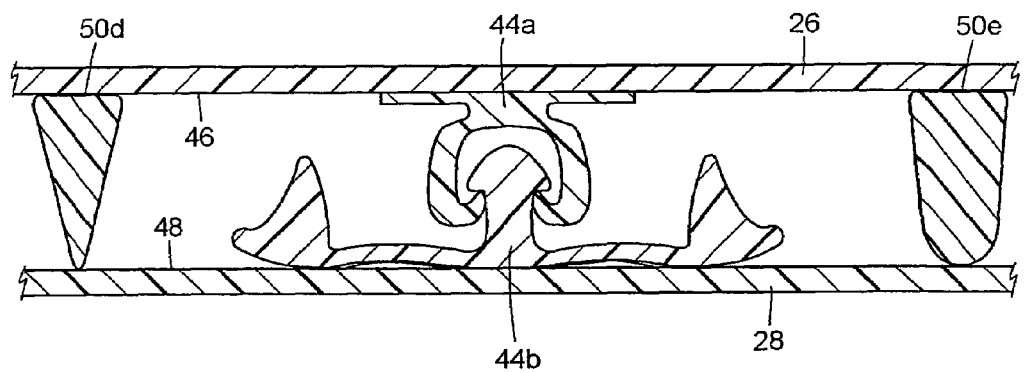
Figure 6:
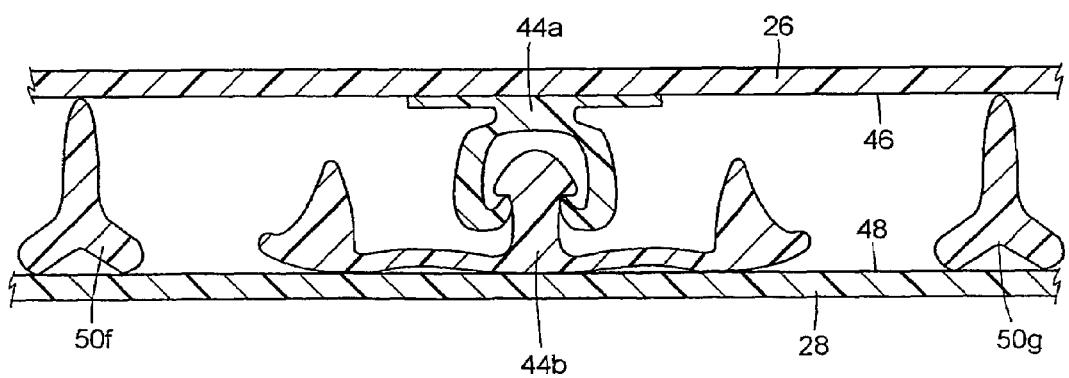

In a preferred embodiment, the guide ribs 50a, 50b are of the same height and such height is greater than the height of the female profile member 64. The guide ribs 50a, 50b can have any suitable cross-sectional configuration, such an inverted T-shape, as seen in FIGS. 2–4 and 7–8, an inverted Y-shape as seen in FIG. 6, a semi-circular cross-sectional shape as seen in FIG. 5, a triangular cross-sectional shape as seen in FIG. 5, etc . . . Preferably, the guide ribs 50a, 50b are spaced apart approximately 0.4 inches on center, are approximately 0.09 inches in height and have an approximate width of 0.067 inches at the widest point thereof.

If desired, a number of guide rib(s) 50 other than two may be provided. In the event that two or more guide ribs are provided, the guide ribs 50 may all have the same cross-sectional shapes and dimensions, or the cross-sectional shapes and/or dimensions may be different. The guide rib(s) 50 may be present in various different arrangements. Thus, for example, as seen in FIGS. 3 and 4, a single rib 50c may be provided on either inside surface 46 or 48, wherein the rib 50c is positioned and configured identically to either of the ribs 50a, 50b described above. In this case, the single rib 50c can be disposed on a side of the member 60 or 64 toward the top portion 36 or toward the bottom portion 34 of the bag.

Other various configurations of guide ribs can be seen in FIGS. 5 and 6. In FIG. 5, two guide ribs 50d and 50e may be provided on the inside surface 46. The ribs 50d and 50e are positioned identically to the ribs 50a, 50b described above, but are configured such that the guide rib 50d has a triangular cross-sectional configuration and the guide rib 50e has a semi-circular cross-sectional configuration. The ribs 50f and 50g of FIG. 6 are configured identically to the ribs 50a, 50b described above, but are disposed on the inside surface 48.

Figure 7:
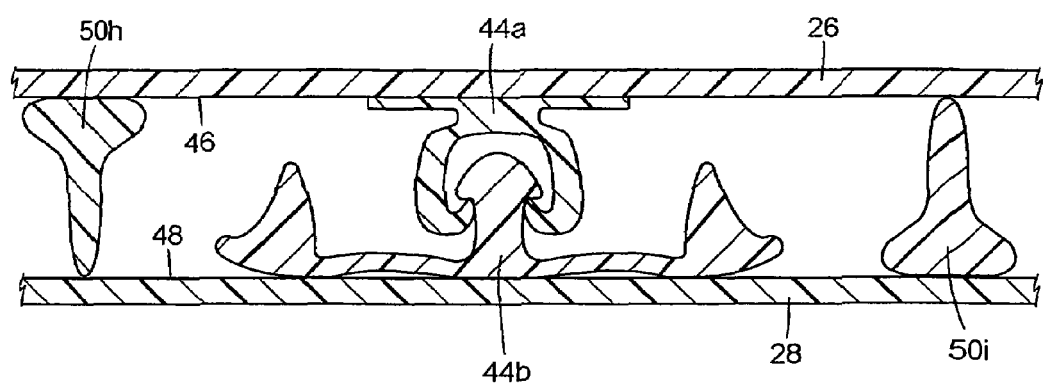
Figure 8:
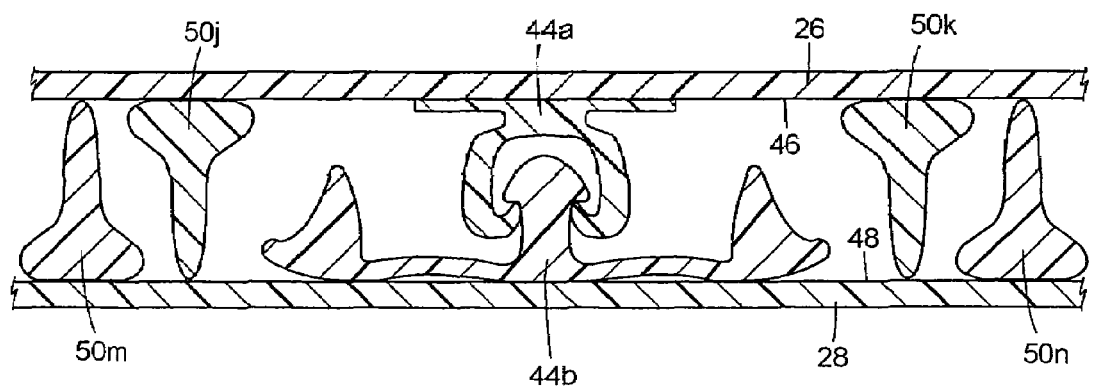

Still more configurations of guide ribs are shown in FIGS. 7 and 8. FIG. 7 illustrates a first guide rib 50h positioned on the inside surface 46 and a second guide rib 50i positioned on the opposite inside surface 48, wherein the guide ribs are configured similarly to the ribs 50a, 50b as described above. In FIG. 8, a first set of guide ribs 50j and 50k is positioned on the inside surface 46 and a second set of guide ribs 50m and 50n is positioned on the inside surface 48. The ribs 50j, 50k are disposed within the ribs 50m, 50n and the ribs 50j, 50k, 50m and 50n are otherwise configured similarly to the ribs 50a, 50b as described above and shown in FIG. 2.

Preferably, although not necessarily, if two guide ribs 50 are positioned adjacent a closure element 44a or 44b, the guide ribs 50 may be spaced equidistant from and on opposite sides of the closure element. Also, if a single rib 50 is positioned on the inside surface 48 adjacent the male closure element 44b and a second single rib 50 is positioned on the opposite inside surface 46 adjacent the female closure element 44a, the guide ribs 50 are preferably (although not necessarily) disposed on opposite sides of the closure elements 44a, 44b and equidistant therefrom.

No matter what configuration is chosen, the guide rib(s) 50 provide raised portions that can be felt by a user's fingers when the user's fingers are brought into contact with one or both external surfaces 70, 72 of the bag walls 26, 28. The raised portion(s) act as a guide for a user's fingers to facilitate the engagement of the male and female closure elements 44a and 44b, and thus sealing of the bag 20.

If desired, one or more gripping ribs 74 may be disposed on the internal surfaces 46, 48 of the bag 20 between the closure elements 44a and 44b and the top portion 36 of the bag 20, wherein the gripping ribs 74 are integrally extruded with the walls of the bag. Any number of gripping ribs 74 can be used, although space is necessary between adjacent ribs in order to facilitate a gripping action with a user's fingers. In a preferred embodiment, about six or seven gripping ribs 74 are disposed on each lip 40 of the bag.

Figure 9:
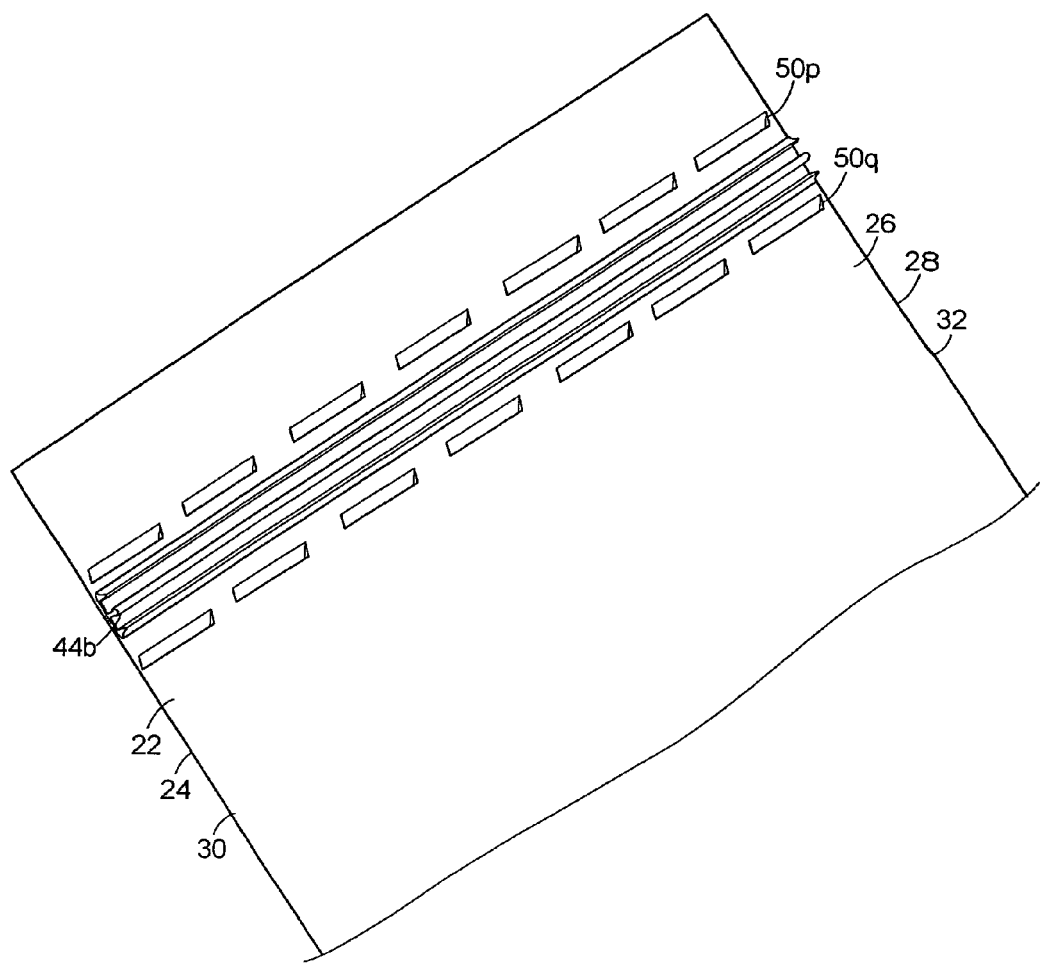
FIG. 9 is an isometric view of a bag according to the present invention having intermittent ribs.

According to an alternate embodiment, one or more intermittent ribs may be provided, as opposed to the continuous ribs 50a–50n described above. FIG. 9 illustrates the second bag wall 28 of the bag 20, wherein two guide ribs 50p and 50q are disposed on the inner surface 48 parallel to and spaced apart from the male closure element 44b and wherein the two ribs 50p, 50q extend intermittently from the first side portion 30 to the second side portion 32 of the bag 20.

Figure 10:
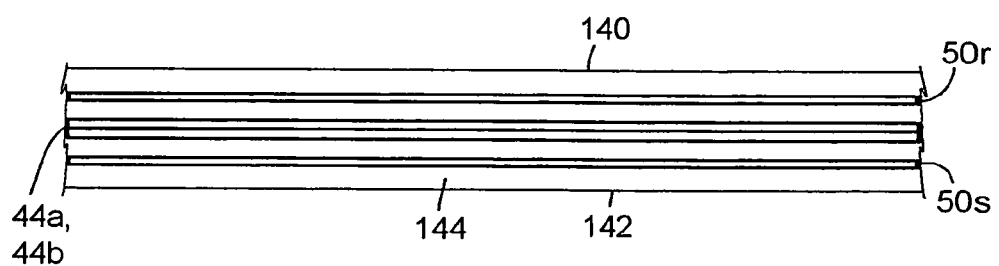
FIG. 10 is a fragmentary and enlarged elevational view of a portion of zipper tape according to the present invention.

Yet another embodiment as shown in FIG. 10 comprises a zipper tape 140. The zipper tape 140 includes first and second thermoplastic strips 142, 144, wherein female and male closure elements 44a, 44b are attached to or otherwise formed on the first and second thermoplastic strips 142, 144, respectively. Continuous or intermittent guide ribs 50r, 50s may be disposed on the first or second thermoplastic strips 142, 144, parallel to and spaced apart from the female or male closure elements 44a, 44b in any configuration as described above. Alternatively, a single guide rib or three or more guide ribs may be disposed on the strips 142, 144 as noted above. The zipper tape 140 may be attached to a folded thermoplastic sheet by any suitable conventional process and apparatus and the resulting structure may be severed and sealed at spaced locations to form individual bags.

Reclosable thermoplastic storage bags as described herein can be produced by any conventional bag-making process, such as a cast post applied process, a cast integral process, a blown process or any other process known in the art. Alternatively, any one of the processes implemented by the apparatus shown in FIGS. 11–19 could be used to produce the bag described herein.

Figure 11:
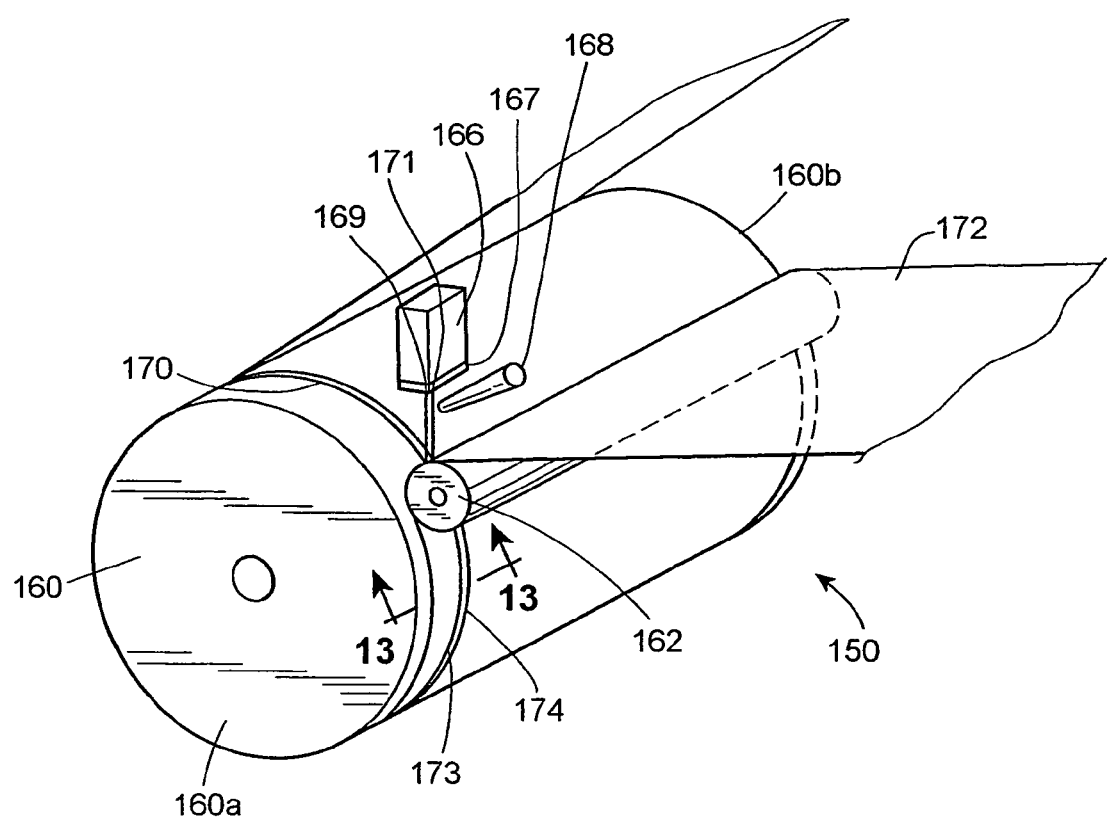
FIG. 11 is an isometric view of an apparatus for producing bags according to the present invention.
Figure 12:
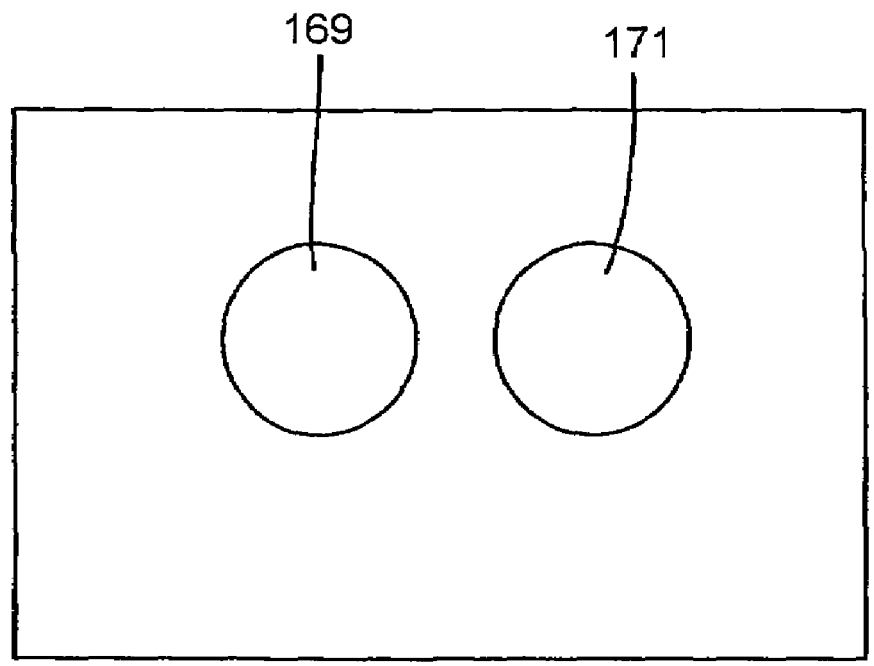
FIG. 12 is a bottom elevational view of an extrusion die profile plate used in the apparatus of FIG. 11.
Figure 13:
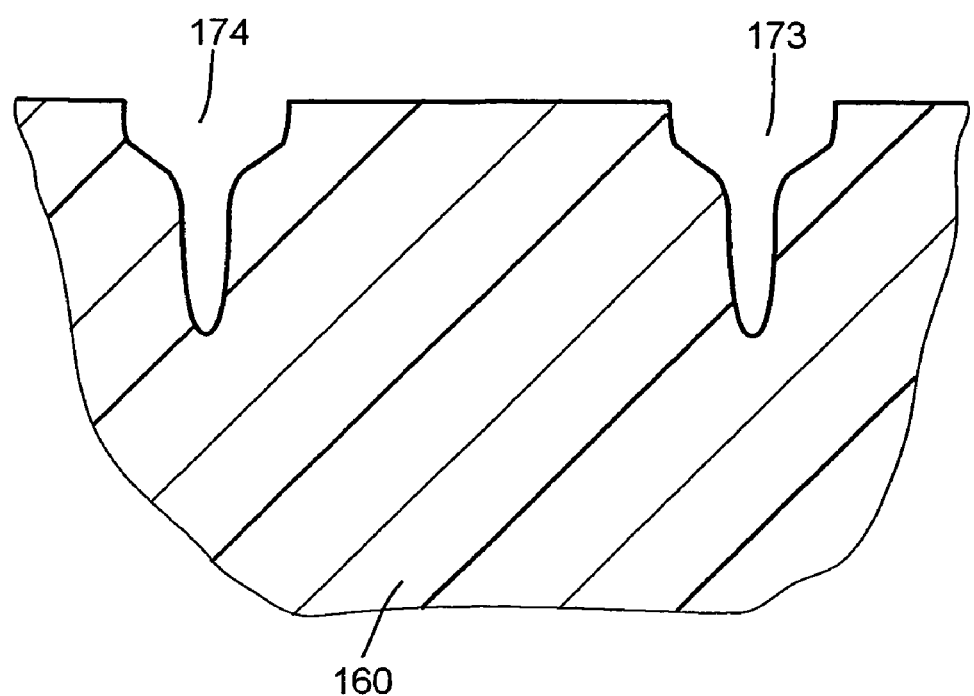
FIG. 13 is a cross-sectional view taken generally along the lines 13—13 of FIG. 11.

If the female and male closure elements 44a, 44b are to be added to a section of film subsequent to the formation of one or more guide ribs 50 thereon, an apparatus as seen in FIGS. 11–13 can be employed. FIG. 11 depicts an apparatus for forming one or more ribs at high speeds that includes a rotatable first roll 160, a rotatable second roll 162, an extrusion profile die 166, and an air nozzle 168 disposed below the extrusion profile die 166. The extrusion profile die 166 includes a profile plate 167 having at least one, and preferably two outlet orifices 169, 171 through which molten polymeric material is extruded into a like number of associated grooves 173, 174, respectively, formed in the first roll 160 at a first axial end 160a thereof. The grooves 173, 174 in the first roll 160 have the same cross-sectional shapes as the desired end shapes of the ribs 50. Preferably, although not necessarily, the grooves 173, 174 have cross-sectional shapes that are substantially identical to one another and the outlet orifices 169,171 have shapes that are substantially identical to one another. Also preferably, (although not necessarily, as noted below) each of the outlet orifices 169,171 has a shape similar or substantially identical to the cross-sectional shape of the associated groove 173, 174 of the first roll 160, whether that shape is an inverted T-shape, an inverted Y-shape, triangular, semi-circular, or another geometric shape. As seen in FIGS. 11, 15, 16 and 18, a positioning system 150 includes the second roll 162 and the film 172 and, in other embodiments such as FIG. 14, may include another rotatable roll 164.

In an alternative embodiment, the outlet orifices 169,171 have cross-sectional shapes that are substantially different than the cross-sectional shapes of the grooves 173, 174. For example, the outlet orifices 169,171 may have a circular shape while the grooves 173, 174 may be triangular in cross-section.

The method includes the steps of feeding molten polymer to extrusion profile die 166 by way of an extruder or melt pump and extruding molten polymer into the grooves 173, 174 of the rotating first roll 160 at an extrusion rate that ensures that the grooves 173, 174 are filled with molten polymer. Thereafter, the air nozzle 168 directs an air flow onto the molten polymer before it is deposited in the grooves 173, 174.

If desired, a different fluid may be directed against the molten polymer in the grooves 173, 174. Also, the single air nozzle 168 may be replaced by two air nozzles wherein each air nozzle directs air against molten polymer in an associated groove 173, 174. Still further, it is possible to eliminate the air nozzle 168 from this process; however, this may require greater positioning accuracy so that the extrudate falls exactly into the grooves 173, 174.

The method further includes the step of moving a section of plastic film 172 over the rotating second roll 162 toward the first roll 160 and into contact with the molten polymer in the grooves 173, 174. Thereafter, the section of plastic film 172 is drawn around a predetermined angular extent of the first roll 160, for example, one half to three quarters of the entire angular extent of the first roll 160. It is also preferred that the first roll 160 be chilled, preferably by passing water therethrough to facilitate bonding of the ribs to the film 172. As should be evident, the larger the diameter of the roll 160, the more cooling can be imparted to the ribs. If desired, water, air or another coolant can be directed against the outer surface of the film section 172 as the film 172 and ribs 50 are moving about the first roll 160 to aid further in cooling of the ribs.

Figure 14:
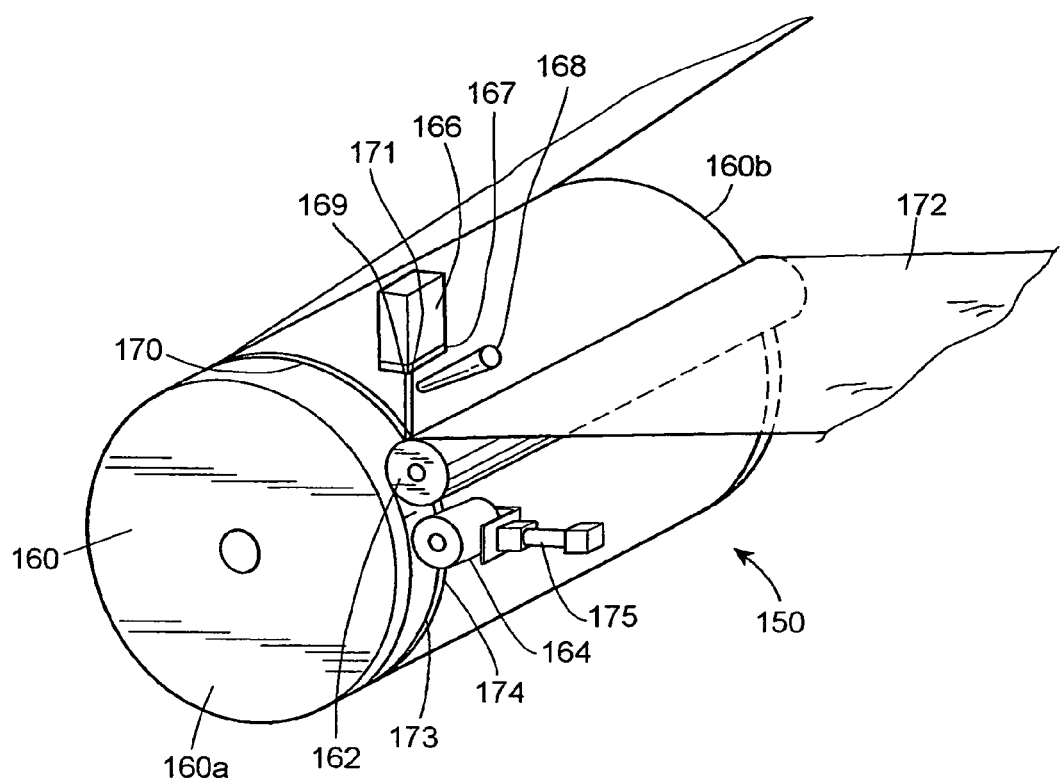
FIGS. 14–16 are isometric views similar to FIG. 11 of an alternate apparatus for producing bags according to the present invention.

Again, if the female and male closure elements 44a, 44b are added to the film in a step subsequent to the step of adding or forming guide ribs 50, another method implemented by the apparatus shown in FIG. 14 can be employed. The apparatus of FIG. 14 is similar to that of FIG. 11, except that it further includes a third rotatable roll 164 positioned below the second roll 162. During movement of the section of plastic film 172, the third roll 164 further presses the section of plastic film 172 overlying the grooves 173, 174 into intimate contact with the molten polymer in the grooves 173, 174 to facilitate bonding and proper formation of the ribs. The third roll 164 is controlled by a hydraulic actuator 175 that controls the amount of pressure exerted on the plastic film 172 by the third roll 164.

Figure 15:
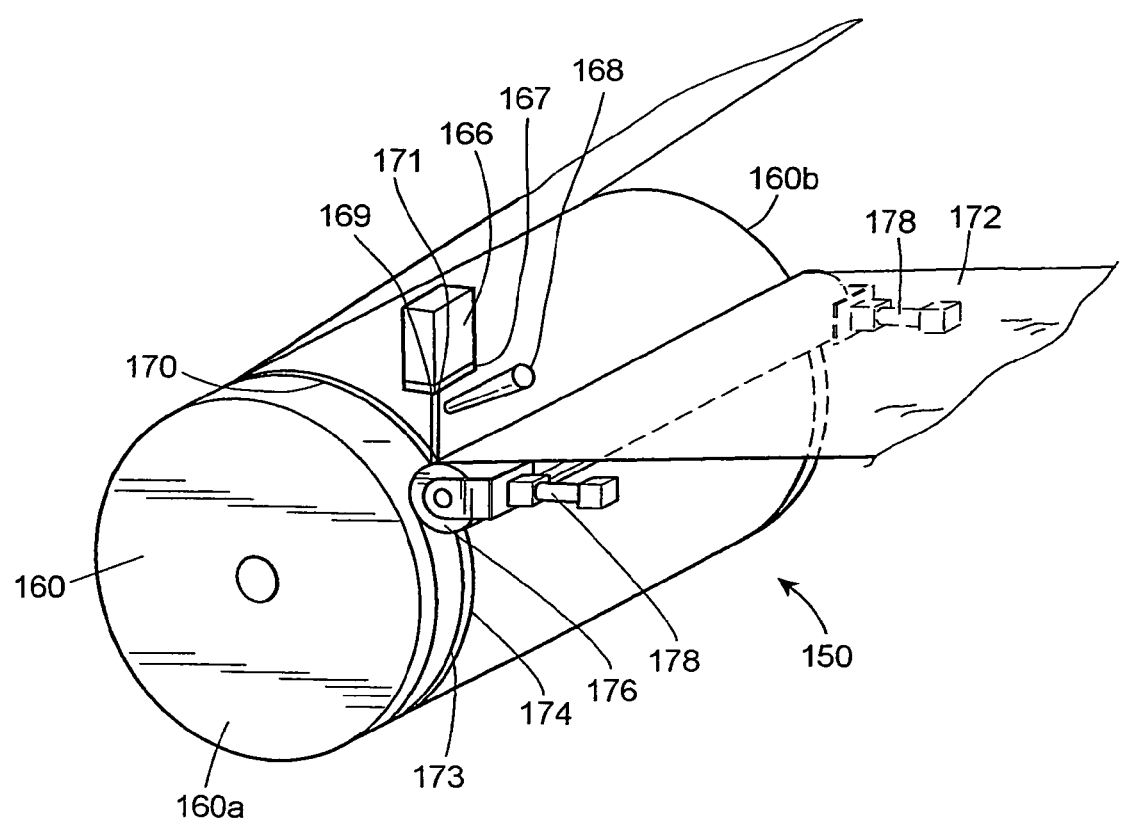

If the female and male closure elements 44a, 44b have already been applied to the film section 172, the embodiment of FIG. 15 can be employed to add or form the guide ribs 50. In FIG. 15, a rotatable roll 176 is situated adjacent the first roll 160. The method includes the same steps as described above in connection with FIGS. 11–13, except that pressure may be applied by the roll 176 against the roll 160 so that the film is brought into intimate contact with the molten polymer in the grooves 173, 174 without deforming the female and male closure elements 44a, 44b. Thereafter, the section of plastic film 172 is drawn around substantially the entire perimeter of the first roll 160. The position of the second roll 176 is controlled by hydraulic actuators 178 that control the amount of pressure exerted by the roll 176 on the roll 160.

Figure 16:
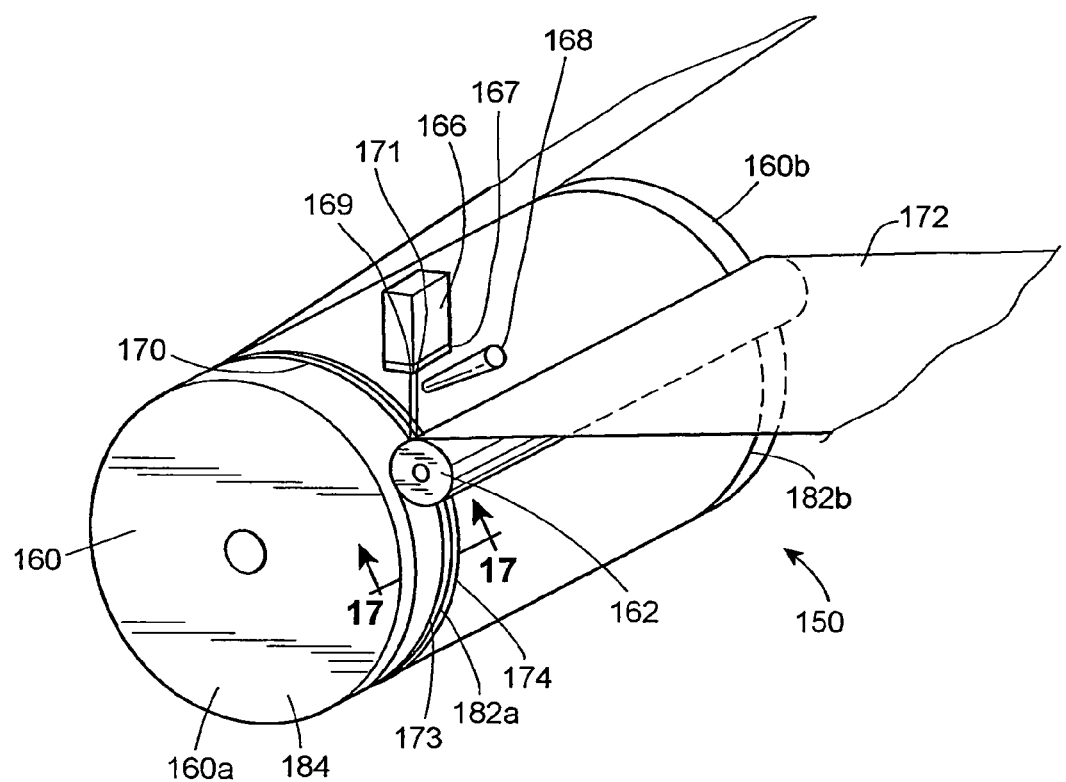
Figure 17:
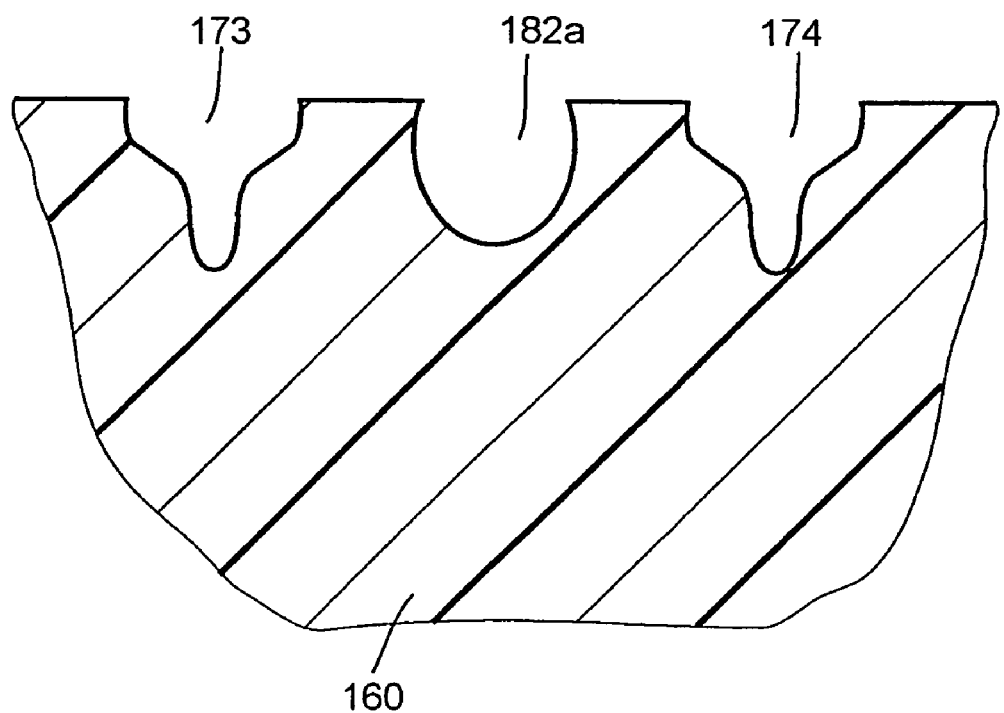
FIG. 17 is a cross sectional view taken generally along the lines 17—17 of FIG. 16.

If the female and male closure elements 44a, 44b have already been applied to the film section 172, the first roll 160 can include first and second additional grooves 182a, 182b, as seen in FIG. 16. The groove 182a is disposed between the grooves 173, 174 at a first end 184 of the roll 160, while the second groove 182b is disposed at a second end 186 of the roll 160. The grooves 182a, 182b accommodate the female and male closure elements 44a, 44b, respectively, in the event that the ribs are to be applied to the same side of the film section 172 as the closure elements 44a, 44b. FIG. 17 shows a cross-sectional view of the three grooves 173, 174 and 182a of FIG. 16. The groove 182a has dimensions that are just slightly larger than the cross-sectional dimensions of the female closure element 44a so that the fit of the closure element 44a in the groove 182a is tight so that positioning accuracy is established and maintained. If desired, the male closure element 44b may also have a tight fit within the groove 182b to obtain further positioning accuracy.

Figure 18:
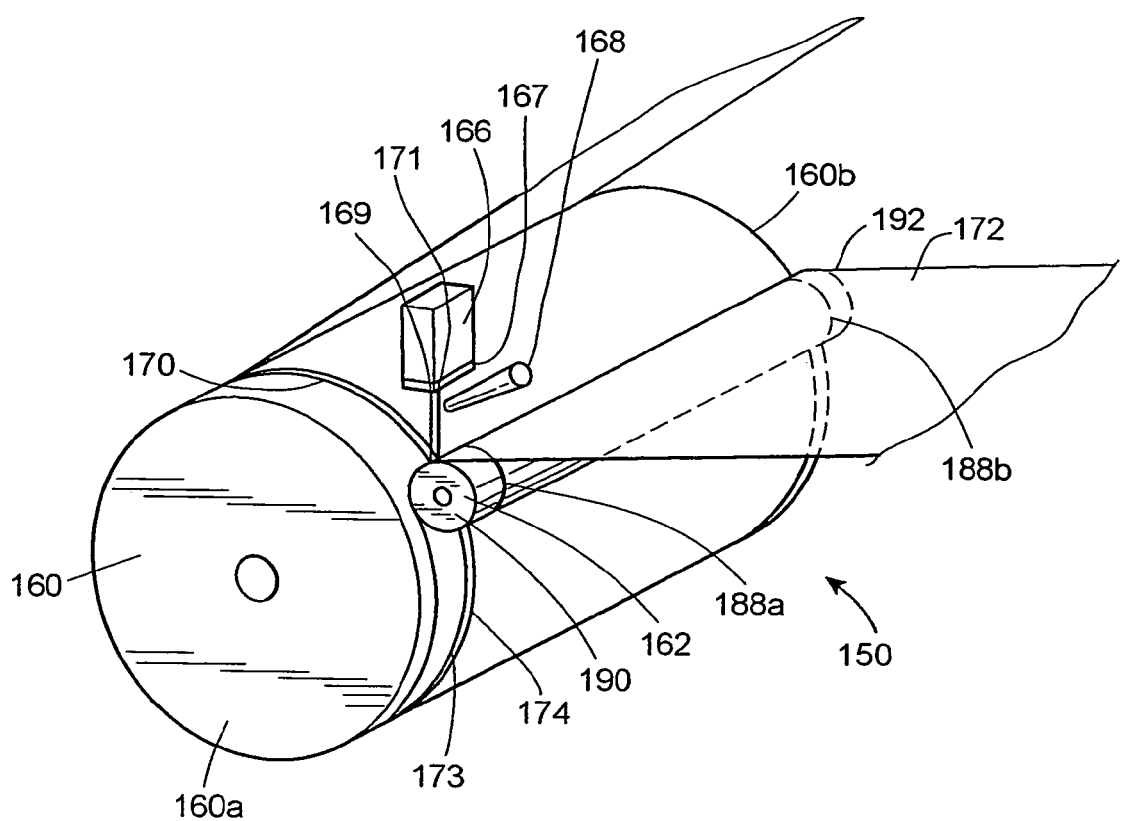
FIG. 18 is an isometric view similar to FIGS. 11 and 14–16 of an alternate apparatus for producing bags.

As a still further alternative, where the ribs are to be applied to a side of the plastic film 172 opposite to the side that carries the female and male closure elements 44a, 44b, grooves may be provided in the first roll 160 and the second roll 162 (or the rolls 164 and/or 176, if used), as shown in FIG. 18. The groove 188a is disposed at a first end 190 of the second roll 162, while the second groove 188b is disposed at a second end 192 of the second roll 162. The grooves 188a, 188b accommodate the female and male closure elements 44a, 44b, respectively. The grooves 188a, 188b have dimensions similar to the grooves 182a, 182b of FIG. 16.

If desired, any or all of the rolls 162, 164 and 176 may be made of rubber or another deformable material that assists in applying pressure to the film while minimizing permanent deformation of the rib(s) and/or closure elements 44a, 44b.

Figure 19:
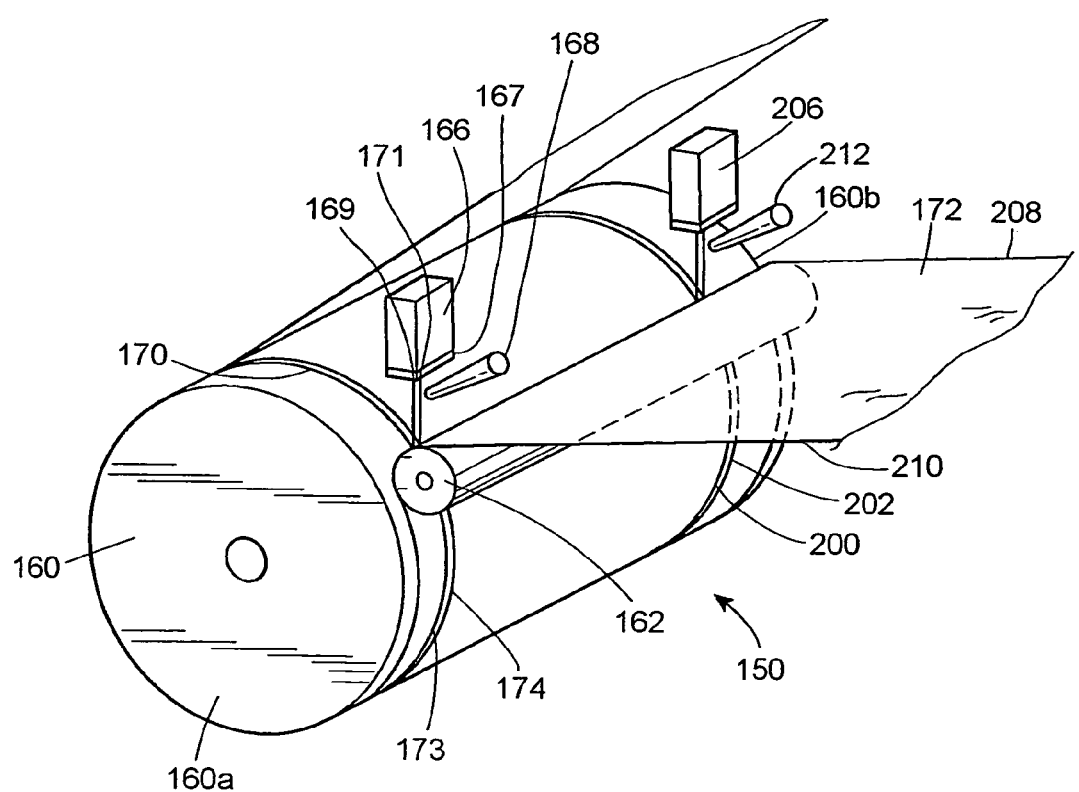
FIG. 19 is an isometric view similar to FIGS. 11 and 14–16 of a still further alternate apparatus for producing bags.

FIG. 19 illustrates yet another alternative apparatus wherein a further pair of grooves 200, 202 substantially identical to the grooves 173, 174 are provided at a second axial end 160b of the roll 160. An extrusion profile die 206 identical or similar to the extrusion profile die 166 is provided having outlet orifices aligned with the grooves 200, 202. The extrusion profile die 206 deposits extrudate into the grooves 200, 202 and the roll 162 presses the film 172 into intimate contact with the extrudate in the grooves 200, 202 to form ribs adjacent an edge 208 of the film 172 opposite an edge 210 at which the ribs 50 are formed in accordance with the apparatus of FIGS. 11–13. An air nozzle 212 directs air against the extrudate before deposit thereof into the grooves 200, 202. As in all of the preceding embodiments, once the ribs are formed by the apparatus of FIG. 19, the film 172 is folded lengthwise and severed and sealed at spaced locations to form individual bags, for example, as seen in FIG. 8.

If desired, the apparatus of FIG. 19 can be modified in accordance with the teachings of any of FIGS. 14–16 and 18.

As should be evident from the foregoing, the bag of FIG. 3 can be produced by any of the apparatus of FIGS. 11–17, so long as a single orifice is provided in the profile plate 167 and a single groove is provided in the roll 160. The same is true of the bag of FIG. 5, so long as grooves 173, 174 of different cross-sectional shape are provided in the roll 162. The bags of FIGS. 4 and 6 can be produced by the apparatus of FIG. 19, so long as the extrusion profile die 166 and the grooves 173, 174 are omitted and the desired number of orifices are provided for the die 206 and a like number of grooves are provided in the roll 160 at the second axial end 160b. The bag illustrated in FIG. 7 can be produced by the apparatus of FIG. 19, modified as noted above to provide a single groove at each axial end 160a, 160b and a single outlet orifice for each die 166 and 206.

INDUSTRIAL APPLICABILITY

The bag described herein advantageously includes at least on guide surface that guides a user's fingers during closure of the bag. Thus, closing efficiency is increased and the expenditure of wasted effort by the user is minimized.

Further, the apparatus and method described herein extrude polymer from a profile die into grooves on a first grooved and cooled roller to create ribs. The still molten ribs are combined with a film and cooled as it rotates around the grooved roller. The use of grooves in the first roller to create the ribs allows the ribs to have a uniform size and shape, whereas, when molten polymer is extruded directly onto a film to create ribs, the ribs may deform or spread out.

The method described herein also has the advantage of being a continuous process that has relatively high production rates of up to or greater than 300 feet per minute. Other similar processes cannot reach such production levels because the time necessary to cool the ribs and film is longer.

Numerous modifications will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

I claim:

1. An apparatus for forming a rib on a section of plastic film, comprising:
    a roll having a groove;
    an extrusion die for extruding molten polymer into the groove; and
    a positioning system comprising a second roll made of a deformable material, wherein the second roll directs the plastic film toward the first-named roll, and wherein the positioning system places the section of plastic film in contact with the molten polymer in the groove such that the molten polymer in the groove is allowed to cool below the melting point thereof while the section of plastic film is in contact with the polymer to cause bonding therebetween and thereby forming the rib.

2. The apparatus of claim 1, wherein the section of plastic film carries a closure element and wherein the second roll includes a groove that receives the closure element.

3. The apparatus of claim 1, wherein the positioning system includes a third roll that presses the section of plastic film against the molten polymer.

4. The apparatus of claim 3, wherein the third roll is made of a deformable material.

5. The apparatus of claim 3, wherein the section of plastic film carries a closure element and wherein at least one of the first-named, second and third rolls includes a groove that receives the closure element.

6. An apparatus for forming a rib on a section of plastic film, comprising:
    a roll having a groove;
    an extrusion die for extruding molten polymer into the groove; and
    a positioning system that places the section of plastic film in contact with the molten polymer in the groove such that the molten polymer in the groove is allowed to cool below the melting point thereof while the section of plastic film is in contact with the polymer to cause bonding therebetween and thereby forming the rib,
    wherein the section of plastic film carries a closure element and wherein the roll includes a groove that receives the closure element when the section of plastic film is in contact with the polymer.

7. The apparatus of claim 6, wherein the groove has dimensions larger than dimensions of the closure element.

8. The apparatus of claim 1, wherein the positioning system includes an air knife that presses the plastic film against the rib.

9. The apparatus of claim 1, wherein the roll is chilled by water.

10. The apparatus of claim 1, wherein the positioning system includes an air nozzle that directs an air flow onto the molten polymer before the molten polymer is deposited into the groove.

11. The apparatus of claim 1, wherein the extrusion die includes a profile plate wherein the profile plate includes an orifice having a cross-sectional shape similar to a cross-sectional shape of the groove.

12. The apparatus of claim 11, wherein the rib has an inverted T-shaped cross-sectional shape.

13. The apparatus of claim 11, wherein the rib has a triangular cross-sectional shape.

14. The apparatus of claim 11, wherein the rib has a semi-circular cross-sectional shape.

15. The apparatus of claim 11, wherein the rib has an inverted Y-shaped cross-sectional shape.

16. The apparatus of claim 11, further comprising an air nozzle disposed below the extrusion die.

17. The apparatus of claim 11, wherein the roll includes a further groove that receives molten polymer wherein the positioning system places the section of plastic film in contact with the molten polymer in the further groove to form a further rib.

* * * * *